United States Patent [19]

Maeda et al.

[11] Patent Number: 5,200,167
[45] Date of Patent: Apr. 6, 1993

[54] METHOD FOR THE PREPARATION OF SPHERICAL, FINE PARTICLE TITANIUM OXIDE

[75] Inventors: Umio Maeda; Tutomu Imagawa; Masatugu Noziri, all of Takaoka, Japan

[73] Assignee: Nippon Soda Co., Ltd., Tokyo, Japan

[21] Appl. No.: 582,193

[22] PCT Filed: Dec. 25, 1989

[86] PCT No.: PCT/JP89/01295
§ 371 Date: Oct. 1, 1990
§ 102(e) Date: Oct. 1, 1990

[87] PCT Pub. No.: WO90/09963
PCT Pub. Date: Sep. 7, 1990

[30] Foreign Application Priority Data

Feb. 28, 1989 [JP] Japan ................................. 1-47533

[51] Int. Cl.$^5$ ............................................ C01G 23/047
[52] U.S. Cl. ....................................... 423/610; 423/608
[58] Field of Search ..................... 423/609, 610, 608; 502/8, 9; 106/436, 497

[56] References Cited

U.S. PATENT DOCUMENTS

| 3,297,414 | 1/1967 | Mazdiyasni et al. | 423/608 |
| 4,543,341 | 9/1985 | Barringer et al. | 423/608 |
| 4,574,078 | 3/1986 | Cortesi et al. | 423/608 |
| 4,732,750 | 3/1988 | Olson et al. | 423/609 |
| 4,842,832 | 6/1989 | Inoue et al. | 423/608 |

FOREIGN PATENT DOCUMENTS

| 60-186418 | 9/1985 | Japan | 423/610 |
| 62-226814 | 10/1987 | Japan | 423/610 |
| 1-145306 | 6/1989 | Japan | 423/610 |
| 2-018323 | 1/1990 | Japan | 423/85 |

OTHER PUBLICATIONS

Cotton et al, "Advanced Inorganic Chemistry", 4th ed., p. 1164.

Primary Examiner—Michael Lewis
Assistant Examiner—Ngoc-Yen M. Nguyen
Attorney, Agent, or Firm—Joseph C. Mason, Jr.; Ronald E. Smith

[57] ABSTRACT

An organic titanium compound and an organic compound which can react with the organic titanium compound, preferably a titanium tetraalkoxide and/or it derivative and methanol, are reacted in gas phase and the obtained product is hydrolyzed to give nearly real spherical, fine particle titanium oxide with no agglomeration and of mono dispersion.

8 Claims, 1 Drawing Sheet

METHOD FOR THE PREPARATION OF SPHERICAL, FINE PARTICLE TITANIUM OXIDE

FIELD OF THE INVENTION

This invention relates to fine particle titanium oxide which is spherical and mono dispersed. The obtained titanium oxide is, for example, used as a material for fine ceramics and cosmetics.

DESCRIPTION OF RELATED ART

Conventional methods for the preparation of titanium oxide from titanium alkoxide include the gas phase pyrolysis method (e.g. Japan Kokai Tokkyo Koho 85186418) and the liquid phase hydrolysis method (e.g. U.S. Pat. No. 4,543,341, Japan Kokai Tokkyo Koho 87226814, and Japan Kokai Tokkyo Koho 87278125). The titanium oxide obtained by the gas phase pyrolysis method is generally amorphous and the particles are often agglomerated so that the agglomerated should be dispersed. With regard to the liquid phase method, such methods as to synthesize spherical titanium oxide of mono dispersion with less agglomerated powder have been proposed, though they have complicated processes and low productivity.

SUMMARY OF THE INVENTION

An organic titanium compound and an organic compound which can react with the said organic titanium compound are heated, the generated vapor of each compound is introduced by a carrier gas into a reaction zone to carry out a gas-phase reaction. Then, the obtained product is hydrolyzed with water, steam or others.

The titanium oxide thus obtained is not agglomerated and is fine particles of mono dispersion and real sphere.

The said organic titanium compound and the organic compound which can react with the organic titanium compound which are used are both a compound which is volatile and gives a solid product by gas-phase reaction of the two compounds.

Organic titanium compounds preferably used are titanium tetraalkoxides and/or their derivatives. The titanium tetraalkoxides include titanium tetraethoxide, titanium tetra-n-propoxide, titanium tetra-i-propoxide, titanium tetra-n-butoxide and titanium-tetra-t-butoxide. The derivatives include their oligomers such as dimers and trimers, and compounds substituted by such substituents as acyloxy group. A mixture of two or more compounds of these can be used.

Out of the above compounds, particularly preferable is at least one compound selected from the group consisting of titanium tetraethoxide, titanium tetrapropoxide and titanium tetra-n-butoxide.

Organic compounds which can react with organic titanium compounds include alcohols and phenols such as methanol, ethylene glycol, phenol and cresol. A mixture of two or more compounds of these can be used. Particularly preferable is methanol.

In the method of this invention, an organic titanium compound and an organic compound which can react with the organic titanium compound are usually heated to vaporize. Any methods for vaporizing them can be acceptable if vapor is generated efficiently. The vapors of organic titanium compound and organic compound which can react with the organic titanium compound are introduced into a reaction zone by using a carrier gas including inert gas such as nitrogen or helium, or air. A preferable reaction section is a tubular device. However any device is acceptable if the gas phase reaction of the two compounds proceeds quickly and efficiently.

A change in vapor concentration of the organic titanium compound in the reaction section can control the grain size. Usual reaction conditions are a holding time of 0.01 to 10 seconds, a flow rate of 0.1 to 10 m/sec, a concentration of organic titanium compound of about 0.001 to about 1% by volume, and a reaction mole ratio of organic compound which can react with the organic titanium compound to the organic titanium compound is about 10 to about 40.

The product obtained in the reaction zone is collected by using a proper filter, and hydrolyzed with such as steam, water or aqueous ammonia. After the hydrolysis, the obtained titanium oxide is dried by a drying oven or others to give the final product.

According to the method of this invention, the titanium oxide particles can be controlled at will in the range of about 0.1 to about 10 μm in diameter and about 1 to about 60 m$^2$/g (BET method) in specific surface area.

The produced titanium oxide may be treated with surface treating agent such as $SiO_2$.

DESCRIPTION OF THE PREFERRED EMBODIMENTS

Example 1

Titanium tetraethoxide was placed in a vessel and heated at 130° C., into which a carrier gas was blown on the liquid surface or in the liquid to introduce the vapor of titanium tetraethoxide into the reaction zone.

Similarly methanol was kept at 20° C. and the methanol vapor was introduced into the reaction section by carrier gas so that the mole ratio to titanium tetraethoxide was 30. At this time, the concentration of titanium tetraethoxide in the reaction zone was 0.07% by volume.

The two compounds were mixed to react in gas-phase. The obtained product was collected by filter, then hydrolyzed with water to give titanium oxide.

The titanium oxide was 0.3 to 0.8 μm in grain size and of nearly real sphere.

Examples 2 and 3

Example 1 was repeated except that the concentration of titanium tetraethoxide to be introduced into the reaction zone was as shown in the following table. Concentrations of titanium tetraethoxide, grain sizes of titanium oxide and BET values are shown in the table.

| Example | Titanium alkoxide vol % | Grain size μm | BET value m$^2$/g |
| --- | --- | --- | --- |
| 1 | 0.07 | 0.3–0.8 | 56 |
| 2 | 0.30 | 0.7–1.3 | 45 |
| 3 | 0.50 | 1.8–3.6 | 20 |

Example 4

Titanium tetra-n-butoxide was placed in a vessel and heated to 130° C., into which a carrier gas was blown in the liquid to introduce the vapor of titanium tetra-n-butoxide into the reaction zone. Methanol kept at 20° C. was vaporized and the vapor was introduced into the reaction zone by carrier gas. The two compounds were mixed to react under the same conditions as those of Example 1. The product was collected by filter, then hydrolyzed with aqueous ammonia to give titanium oxide.

The product was confirmed to be spherical titanium oxide of 0.1 to 0.3 μm in grain size by SEM.

Example 5

Titanium tetra-n-butoxide was placed in a vessel and heated at 165° C. into which a carrier gas was blown on the liquid surface or in the liquid to introduce the vapor of titanium tetra-n-butoxide into the reaction zone.

Similarly methanol was kept at 20° C. and the methanol vapor was introduced into the reaction section by carrier gas so that the mole ratio to titanium tetra-n-butoxide was 30. At this time, the concentration of titanium tetra-n-butoxide in the reaction zone was 0.08% by volume.

the two compounds were mixed to react in gas-phase. The obtained product was collected by filter, then hydrolyzed with steam to give titanium oxide.

Figure 1:
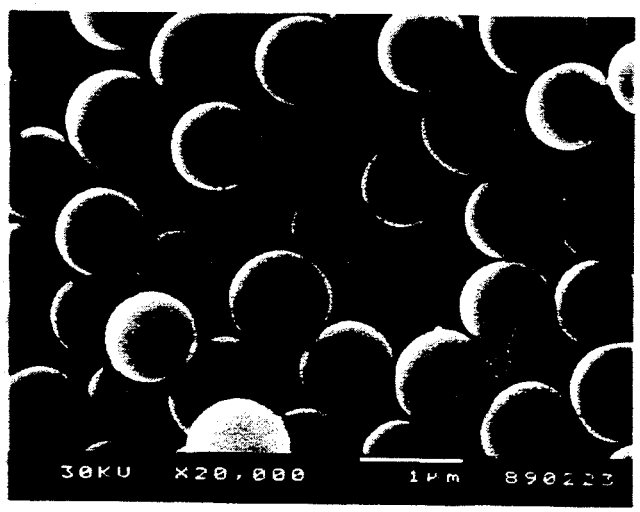
FIGS. 1 and 2 are SEM photographs showing the shape of the titanium oxide particles obtained in Example 5 and 6, respectively.

The titanium oxide was 0.5 to 0.8 μm in grain size and of nearly real sphere. An SEM photograph of the obtained titanium oxide is shown in FIG. 1.

Example 6

A mixture of titanium tetra-n-propoxide and titanium tetra-i-propoxide was placed in a vessel and heated at 150° C., into which a carrier gas was blown in the liquid to introduce the mixed vapor of titanium tetra-n-propoxide and titaniumtetra-i-propoxide into the reaction zone. Methanol kept at 35° C. was vaporized and the vapor was introduced by carrier gas into the reaction zone. At this time, the mole ratio of methanol to the titanium alkoxides was 30, and the titanium alkoxides were 1.3% by volume in concentration.

The two were mixed to react in gas phase. The obtained product was collected by filter, then hydrolyzed with steam to give titanium oxide.

Figure 2:
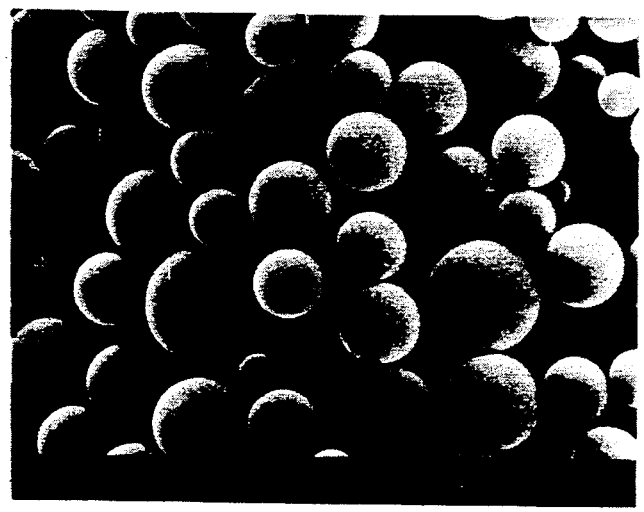

The titanium oxide was 2 to 8 μm in grain size, not agglomerated, and of nearly real sphere. An SEM photograph of the obtained titanium oxide is shown in FIG. 2.

Comparative Example

Titanium tetra-i-propoxide was placed in a vessel and heated to 150° C., into which a carrier gas was blown in a space above the liquid surface or in the liquid to introduce the vapor of titanium tetra-i-propoxide into the reaction zone. Similarly water was heated to 80° C., and steam was introduced into the reaction zone by carrier gas. The two compounds were mixed to hydrolyze in a gas phase. The formed titanium oxide was collected by filter.

Figure 3:
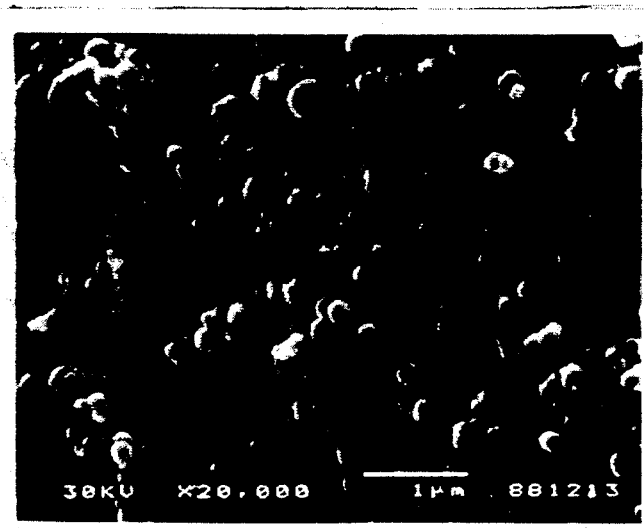
FIG. 3 is an SEM photograph showing the shape of the titanium oxide particle obtained in the comparative example.

Most of particles of the obtained titanium oxide were agglomerated, unlike those of the titanium oxide obtained by this invention (FIG. 3).

If particles are agglomerated, the smoothness and gloss become bad when they are kneaded in textile.

INDUSTRIAL APPLICABILITY

As described above, an organic titanium compound and an organic compound which can react with the organic titanium compound, preferably a titanium tetraalkoxide and/or its derivative and methanol, are reacted in gas phase to give nearly real spherical, fine particle titanium oxide with no agglomeration of particles and of mono dispersion. In addition, according to the method of this invention, it is possible to control the grain size at will.

Therefore, titanium oxide obtained by the preparation method of this invention can be used in a wide variety of applications such as fine ceramics, cosmetics, pigments, fillers and catalysts.

We claim:

1. Method for preparing titanium oxide which comprises
    (a) vaporizing a liquid consisting essentially of titanium alkoxide to form a first vapor;
    (b) vaporizing methanol to form a second vapor;
    (c) contacting the first vapor and second vapor under gas phase conditions sufficient to cause the reaction of the first vapor with the second vapor thereby forming a first solid particle reaction product therefrom;
    (d) hydrolyzing the first solid particle reaction product thereby forming a second solid particle reaction product comprising titanium oxide;
    (e) drying the second solid particle titanium oxide reaction product and recovering essentially spherical, fine particles of titanium oxide.

2. Method according to claim 1 wherein the organic titanium alkoxide is a titanium tetraethoxide.

3. Method according to claim 1 wherein the organic titanium alkoxide is selected from the group consisting of: titanium tetraethoxide, titanium tetra-n-propoxide, titanium tetraisopropoxide, titanium tetra-n-butoxide and titanium tetra-t-butoxide.

4. Method for preparing essentially spherical, mono-dispersed, non-agglomerated particles of titanium oxide which comprises:
    (a) vaporizing a source consisting essentially of titanium tetraalkoxide compound selected from the group consisting of: titanium tetraethoxide, titanium tetra-n-propoxide, titanium tetra-i-propoxide, titanium tetra-n-butoxide, titanium tetra-t-butoxide, derivatives and mixtures thereof in a first vaporization zone thereby forming a first vapor;
    (b) vaporizing methanol in a second vaporization zone thereby forming a second vapor;
    (c) introducing the first vapor and the second vapor into a reaction zone maintained under gas phase conditions sufficient for the first vapor to react with the second vapor thereby producing a first solid particle reaction product;
    (f) hydrolyzing the first solid particle reaction product thereby producing a second reaction product comprising titanium oxide; and,
    (g) drying the second reaction product and recovering essentially spherical, mono-dispersed, non-agglomerated particles of titanium oxide.

5. Method according to claim 4 wherein the molar ratio of methanol to titanium tetraalkoxide is from 10 to 40 and the concentration of the titanium tetraalkoxide in the reaction zone is 0.001 to 10% by volume.

6. Method for preparing spherical, monodispersed, non-agglomerated fine particles of titanium oxide which comprises reacting a vapor consisting essentially of titanium alkoxide and methanol in gas phase and hydrolyzing the reaction product.

7. Method according to claim 6 wherein the organic titanium compound comprises titanium tetraalkoxide, its derivatives and mixtures thereof.

8. Method according to claim 6 wherein the titanium compound is selected from the group consisting of titanium tetraethoxide, titantium tetrapropoxide, titanium tetrabutoxide, derivatives and mixtures thereof.

* * * * *